US010523487B2

(12) United States Patent
Huang et al.

(10) Patent No.: US 10,523,487 B2
(45) Date of Patent: Dec. 31, 2019

(54) FRAME SYNCHRONIZATION METHOD AND APPARATUS (71) Applicant: HUAWEI TECHNOLOGIES CO., LTD., Shenzhen, Guangdong (CN)

(72) Inventors: Huang Huang, Chengdu (CN); Xi Yan, Shenzhen (CN); Sainan Li, Chengdu (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 99 days.

(21) Appl. No.: 15/341,543

(22) Filed: Nov. 2, 2016

(65) Prior Publication Data
US 2017/0048093 A1 Feb. 16, 2017

Related U.S. Application Data (63) Continuation of application No. PCT/CN2014/076726, filed on May 4, 2014.

(51) Int. Cl.
*H04L 27/26* (2006.01)
*H04L 7/00* (2006.01)
*H04W 56/00* (2009.01)

(52) U.S. Cl.
CPC ........ *H04L 27/2656* (2013.01); *H04L 7/0016* (2013.01); *H04L 27/26* (2013.01);
(Continued)

(58) Field of Classification Search
CPC .................................................. H04L 27/2656
See application file for complete search history.

(56) References Cited

U.S. PATENT DOCUMENTS 7,809,097 B2 * 10/2010 Wang .................. H04L 27/2656
375/149
2005/0163263 A1 * 7/2005 Gupta ................. H04L 27/2656
375/343
(Continued)

FOREIGN PATENT DOCUMENTS

CN 1964341 A 5/2007
CN 101282128 A 10/2008
(Continued)

OTHER PUBLICATIONS

"International Search Report dated Feb. 10, 2015, in International Application No. PCT/CN2014/076726".

*Primary Examiner* — Ayanah S George
(74) *Attorney, Agent, or Firm* — Kilpatrick Townsend & Stockton LLP (57) ABSTRACT Embodiments of the present invention provide a frame synchronization method and apparatus, which can reduce impact of a carrier frequency offset. In those embodiment, a solution is provided and the solution includes: obtaining a received signal of a receiving antenna; calculating an auto-correlation value of the received signal and determining a time corresponding to the auto-correlation value that is of the received signal and that meets a first preset condition, as an initial estimation time; obtaining a carrier frequency offset estimation value according to the initial estimation time, the received signal, and a frequency offset estimation algorithm, and performing frequency offset compensation on the received signal by using the carrier frequency offset estimation value; calculating a cross-correlation value and an auto-correlation value of the received signal on which the frequency offset compensation has been performed. The embodiments of the present invention are used for frame synchronization.

14 Claims, 4 Drawing Sheets (52) U.S. Cl.
CPC ....... *H04L 27/2657* (2013.01); *H04W 56/004* (2013.01); *H04L 27/2675* (2013.01)

(56) References Cited

U.S. PATENT DOCUMENTS

| | | | |
|---|---|---|---|
| 2007/0133386 A1* | 6/2007 | Kim | H04J 11/0069 370/203 |
| 2009/0154529 A1 | 6/2009 | Cho et al. | |
| 2011/0249780 A1 | 10/2011 | Mollfulleda San Julian et al. | |
| 2011/0317792 A1 | 12/2011 | Sen et al. | |

FOREIGN PATENT DOCUMENTS

| | | | |
|---|---|---|---|
| CN | 101312454 A | 11/2008 |
| CN | 101409700 A | 4/2009 |
| CN | 101778066 A | 7/2010 |
| CN | 102065048 A | 5/2011 |
| CN | 103259757 A | 8/2013 |

* cited by examiner

FRAME SYNCHRONIZATION METHOD AND APPARATUS

CROSS-REFERENCE TEMPLATES

This Application is a continuation of International Application No. PCT/CN2014/076726, filed on May 4, 2014, the disclosure of which is hereby incorporated by reference in its entirety.

TECHNICAL FIELD

Embodiments of the present invention relate to the communications field, and in particular, to a frame synchronization method and apparatus.

BACKGROUND

In a communications system, frame synchronization at a receive end is very important and essential, and data transmission is basically transmission in a frame based format. If the frame synchronization is incorrect, an error of a frame of data is caused. A frame generally includes a preamble signal and data. The frame synchronization is: The receive end determines a start point of data in a frame of a signal by using a preamble signal, and then demodulates the data.

A method for determining a frame synchronization time in the prior art is: A transmit end transmits, in a preamble symbol, a fixed sequence known by a receive end, and the receive end obtains an auto-correlation value M(d) by performing an auto-correlation operation on a received signal, and if the auto-correlation value M(d) exceeds a preset threshold, determines that a current time d is a frame synchronization time, thereby implementing time synchronization. Alternatively, a transmit end transmits, in a preamble symbol, a fixed sequence known by a receive end, and the receive end obtains a cross-correlation value M(d) by performing a cross-correlation operation on a received signal, and if the cross-correlation value M(d) exceeds a preset threshold, determines that a current time d is a frame synchronization time. However, the two existing methods are greatly affected by a carrier frequency offset, which may cause that a correct frame synchronization time cannot be found.

SUMMARY

Embodiments of the present invention provide a frame synchronization method and apparatus, which can reduce impact of a carrier frequency offset, and determine a precise frame synchronization time, thereby accurately demodulating data.

To achieve the foregoing objective, the following technical solutions are used in the embodiments of the present invention:

According to a first aspect, an embodiment of the present invention provides a frame synchronization method, where the method includes: obtaining a received signal of a receiving antenna; obtaining an auto-correlation value of the received signal according to the received signal and an auto-correlation algorithm; determining a time corresponding to the auto-correlation value that is of the received signal and that meets a first preset condition, as an initial estimation time; obtaining a carrier frequency offset estimation value according to the initial estimation time, the received signal, and a frequency offset estimation algorithm, and performing frequency offset compensation on the received signal by using the carrier frequency offset estimation value; obtaining, according to the received signal on which the frequency offset compensation has been performed, a preamble signal that is sent by a transmitting antenna and that meets a second preset condition, a cross-correlation algorithm, and the auto-correlation algorithm, a cross-correlation value and an auto-correlation value of the received signal on which the frequency offset compensation has been performed; and determining a time corresponding to the cross-correlation value and the auto-correlation value that are of the received signal on which the frequency offset compensation has been performed and that meet a third preset condition, as a frame synchronization time, and demodulating data according to the frame synchronization time to complete frame synchronization.

According to a second aspect, an embodiment of the present invention further provides a frame synchronization apparatus, where the apparatus includes: a communications interface, a memory, and a processor, where the communications interface is configured to communicate with a network element; the memory is configured to store computer code; and the processor is configured to execute the computer code to: obtain a received signal of a receiving antenna; obtain an auto-correlation value of the received signal according to the received signal and an auto-correlation algorithm; determine a time corresponding to the auto-correlation value that is of the received signal and that meets a first preset condition, as an initial estimation time; obtain a carrier frequency offset estimation value according to the initial estimation time, the received signal, and a frequency offset estimation algorithm, and perform frequency offset compensation on the received signal by using the carrier frequency offset estimation value; obtain, according to the received signal on which the frequency offset compensation has been performed, a preamble signal that is sent by a transmitting antenna and that meets a second preset condition, a cross-correlation algorithm, and the auto-correlation algorithm, a cross-correlation value and an auto-correlation value of the received signal on which the frequency offset compensation has been performed; and determine a time corresponding to the cross-correlation value and the auto-correlation value that are of the received signal on which the frequency offset compensation has been performed and that meet a third preset condition, as a frame synchronization time, and demodulate data according to the frame synchronization time to complete frame synchronization.

According to the frame synchronization method and apparatus provided in the embodiments of the present invention, first, a received signal of a receiving antenna is obtained; then an auto-correlation value of the received signal is obtained according to the received signal and an auto-correlation algorithm, and a time corresponding to the auto-correlation value that is of the received signal and that meets a first preset condition is determined as an initial estimation time; then a carrier frequency offset estimation value is obtained according to the initial estimation time, the received signal, and a frequency offset estimation algorithm, and frequency offset compensation is performed on the received signal by using the carrier frequency offset estimation value; then a cross-correlation value and an auto-correlation value of the received signal on which the frequency offset compensation has been performed are obtained according to the received signal on which the frequency offset compensation has been performed, a preamble signal that is sent by a transmitting antenna and that meets a second preset condition, a cross-correlation algorithm, and the auto-correlation algorithm; a time corresponding to the cross-correlation value and the auto-correlation value that are of the received signal on which the frequency offset compensation has been performed and that meet a third preset condition is determined as a frame synchronization time, and data is demodulated according to the frame synchronization time to complete frame synchronization. In this way, impact of a carrier frequency offset can be reduced to determine a precise frame synchronization time, thereby accurately demodulating data.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
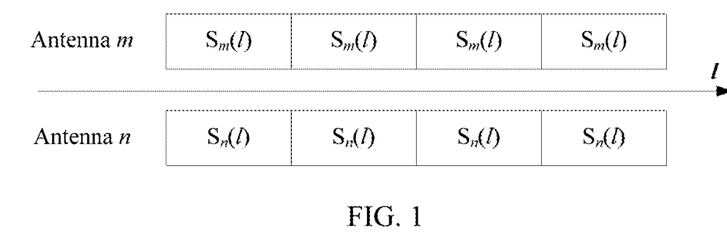
FIG. 1 is a schematic diagram in which a transmitting antenna transmits a preamble signal according to an embodiment of the present invention.

The embodiments of the present invention are based on a universal N×M multiple input multiple output (MIMO) communications system, which includes M transmitting antenna s, and N receiving antennas. Each transmitting antenna transmits $\alpha \geq 2$ same preamble signals. The MIMO communications system uses a multi-carrier modulation mode, that is, an orthogonal frequency division multiplexing (OFDM) technology. For example, a quantity of subcarriers in an OFDM symbol in a frequency domain is 128, that is, a subcarrier set is $\{0, 1, \ldots, 127\}$. A Zadoff-Chu sequence is inserted every three subcarriers, that is, each subcarrier of a transmitting antenna m transmits $\{0, 0, a1, 0, 0, 0, a2, 0, \ldots, a32, 0\}$. Zadoff-Chu sequences $\{a1, a2, \ldots, a32\}$ are transmitted in subcarriers $\{2, 6, 10, \ldots, 126\}$, and a length of a preamble signal transmitted on $S_m(l)$ is L=128/4=32. Each subcarrier of a transmitting antenna n transmits $\{0, 0, b1, 0, 0, 0, b2, 0, \ldots, b32, 0\}$. Zadoff-Chu sequences $\{b1, b2, \ldots, b32\}$ are transmitted in subcarriers $\{2, 6, 10, \ldots, 126\}$, and a length of a preamble signal transmitted on $S_n(l)$ is L=128/4=32. $\{a1, a2, \ldots, a32\}$ and $\{b1, b2, \ldots, b32\}$ are Zadoff-chu sequences that are not related to each other. In a time domain, as shown in FIG. 1, the transmitting antenna m transmits $\alpha$=4 same preamble signals $S_m(l)$, and the transmitting antenna n transmits $\alpha$=4 same preamble signals $S_n(l)$.

It should be noted that, a preamble signal transmitted by a transmitting antenna in the embodiments of the present invention meets the following conditions:

$$\sum_{l=0}^{L-1} S_m(l)S_m^*(l) \geq 3 \sum_{l=0}^{L-1} S_n(l)S_m^*(l) \quad n \neq m$$

and $$\sum_{l=0}^{L-1} S_m(l)S_m^*(l) \geq 3 \sum_{l=0}^{L-1} S_m[(l+p)_L]S_m^*(l) \quad p \neq 0,$$

where $S_m(l)$ is a preamble signal sent by a transmitting antenna m, $S_n(l)$ is a preamble signal sent by a transmitting antenna n, $[l+p]_L$ represents performing a cyclic shift of on l+p by a length L, m and n represent numbers of different transmitting antenna s, L is a length of $S_m(l)$, l is an integer and has a value set of $\{0, \ldots, L-1\}$, p is an integer and has a value set that is a set consisting of remaining elements obtained after an element 0 is removed from the value set of l, and * represents performing a conjugate operation.

Figure 2:
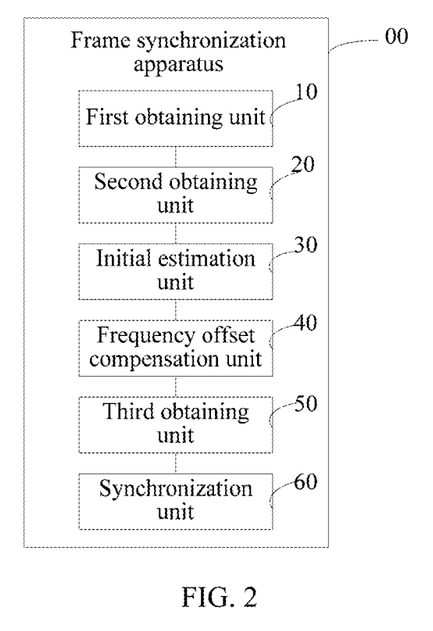
FIG. 2 is a schematic structural diagram of a frame synchronization apparatus according to an embodiment of the present invention.

An embodiment of the present invention provides a frame synchronization apparatus 00, which is based on a receive end side. As shown in FIG. 2, the apparatus 00 includes: a first obtaining unit 10, a second obtaining unit 20, an initial estimation unit 30, a frequency offset compensation unit 40, a third obtaining unit 50, and a synchronization unit 60.

The first obtaining unit 10 is configured to obtain a received signal of a receiving antenna.

Exemplarily, in a MIMO communications system, it is assumed that there are N receiving antennas, and the first obtaining unit 10 may obtain a received signal of each receiving antenna.

The second obtaining unit 20 is configured to obtain an auto-correlation value of the received signal according to the received signal and an auto-correlation algorithm.

In some embodiments, the second obtaining unit 20 may be configured to calculate the auto-correlation value of the received signal according to a first auto-correlation value formula, where the first auto-correlation value formula includes:

$$\Gamma(t_0) = \sum_{n \in T} \frac{\sum_{l=0}^{L-1} y_n(t_0 - l - L)y_n^*(t_0 - l)}{\sum_{l=0}^{L-1} |y_n(t_0 - l)|^2},$$

where $\Gamma(t_0)$ is an auto-correlation value of the received signal at a time $t_0$, $y_n$ represents a received signal of a receiving antenna n, L is a length of a preamble signal, l is an integer and has a value set of $\{0, \ldots, L-1\}$, T is a set of receiving antennas for initial statistics collection, and * represents performing a conjugate operation.

It should be noted that, the method for the second obtaining unit 20 to calculate the auto-correlation value according to the received signal may be a calculation method in the prior art, and the method is an exemplary method provided in this embodiment of the present invention, which is not limited in the present invention.

The initial estimation unit 30 is configured to determine a time corresponding to the auto-correlation value that is of the received signal and that meets a first preset condition, as an initial estimation time.

In some embodiments, the initial estimation unit 30 may be configured to compare the auto-correlation value of the received signal with a first preset threshold; and if the auto-correlation value of the received signal is greater than or equal to the first preset threshold, determine the time corresponding to the auto-correlation value of the received signal as the initial estimation time.

Exemplarily, the first preset threshold may be set to $\rho \in [0.5, 1]$, where a value of $\rho$ may be selected according to an actual need during calculation, $\Gamma(t_0)$ obtained by the second obtaining unit 20 is compared with $\rho$, and if $\Gamma(t_0) \geq \rho$, the time $t_0$ is determined as the initial estimation time.

The frequency offset estimation unit 40 is configured to obtain a carrier frequency offset estimation value according to the initial estimation time, the received signal, and a frequency offset estimation algorithm, and perform frequency offset compensation on the received signal by using the carrier frequency offset estimation value.

In some embodiments, the frequency offset estimation unit 40 may be configured to calculate the carrier frequency offset estimation value according to a frequency offset estimation formula, where the frequency offset estimation formula includes:

$$\Delta f_c = -\frac{T_s}{2\pi L} R\left(\sum_{n \in K} \sum_{l=0}^{L-1} y_n(t_1 - l - L) y_n^*(t_1 - l)\right);$$

and use the carrier frequency offset estimation value as an input to a frequency offset compensation formula to obtain the received signal on which the frequency offset compensation has been performed, where the frequency offset compensation formula includes:

$$\tilde{y}_n(l) = y_n(l) \times e^{-j2\pi \Delta f_c l T_s},$$
$$n \in N,$$

where $\tilde{y}_n$ is a received signal, of a receiving antenna n, on which the frequency offset compensation has been performed, $y_n$ represents the received signal of the receiving antenna n, $\Delta f_c$ is the carrier frequency offset estimation value, l is an integer and has a value set of $\{0, \ldots, L-1\}$, $T_s$ is a time interval between adjacent $S_m(l)$ and $S_m(l+1)$ that are transmitted by a transmitting antenna m, L is a length of a preamble signal, $t_1 = t_0 + \eta$, $t_0$ is the initial estimation time, $\eta \in \{0, \alpha L\}$, $\alpha$ is a quantity of preamble signals sent by the transmitting antenna, K is a set of receiving antennas for frequency offset estimation, N is a set of receiving antennas, and * represents performing a conjugate operation.

It should be noted that, when a frequency offset compensation operation is performed on a received signal, the set $K \subseteq N$. That is, the set of receiving antennas for frequency offset estimation may not include all receiving antennas but include some receiving antennas. When frequency offset compensation is performed on a received signal, an antenna that belongs to the set K estimates a carrier frequency offset estimation value of the antenna and then performs frequency offset compensation on the antenna. To reduce complexity, a particular receiving antenna may not participate in frequency offset estimation, but perform frequency offset compensation by using a carrier frequency offset estimation value of a combination of receiving antennas whose carrier frequency offsets are close or the same. For example, a receiving antenna $p \notin K$ but $p \notin N$. When frequency offset compensation is performed on $y_p(l)$, $$\tilde{y}_p(l) = y_p(l) \times e^{-j2\pi \Delta f_c l T_s}.$$

The third obtaining unit 50 is configured to obtain, according to the received signal on which the frequency offset compensation has been performed, a preamble signal that is sent by a transmitting antenna and that meets a second preset condition, a cross-correlation algorithm, and the auto-correlation algorithm, a cross-correlation value and an auto-correlation value of the received signal on which the frequency offset compensation has been performed.

In some embodiments, the third obtaining unit 50 may be configured to calculate, according to a cross-correlation value formula, the cross-correlation value of the received signal on which the frequency offset compensation has been performed, where the cross-correlation value formula includes:

$$A(t_2) = \sum_{m \in A_t} \sum_{n \in A} \sum_{l=0}^{L-1} \tilde{y}_n(t_2 - l) S_m^*(L - 1 - l),$$

where $A(t_2)$ is a cross-correlation value, at a time $t_2$, of the received signal on which the frequency offset compensation has been performed, $A_t$ is a set of transmitting antennas for calculating a cross-correlation, A is a set of receiving antennas for calculating a cross-correlation value, $\tilde{y}_n$ is a received signal, of a receiving antenna n, on which the frequency offset compensation has been performed, $S_m$ is a preamble signal sent by a transmitting antenna m, L is a length of the preamble signal, l is an integer and has a value set of $\{0, \ldots, L-1\}$, and * represents performing a conjugate operation; and to calculate, according to a second auto-correlation value formula, the auto-correlation value of the received signal on which the frequency offset compensation has been performed, where the second auto-correlation value formula includes:

$$\Gamma(t_2) = \sum_{n \in T} \frac{\sum_{l=0}^{L-1} \tilde{y}_n(t_2 - l - L) \tilde{y}_n^*(t_2 - l)}{\sum_{l=0}^{L-1} |\tilde{y}_n(t_2 - l)|^2},$$

where $\Gamma(t_2)$ is an auto-correlation value, at the time $t_2$, of the received signal on which the frequency offset compensation has been performed, $\tilde{y}_n$ represents the received signal, of the receiving antenna n, on which the frequency offset compensation has been performed, L is the length of the preamble signal, l is the integer and has the value set of $\{0, \ldots, L-1\}$, T is a set of receiving antennas for initial statistics collection, and * represents performing a conjugate operation.

It should be noted that, because the frequency offset compensation is performed on the received signal of the receiving antenna, compared with the prior-art method in which an auto-correlation value or a cross-correlation value is directly calculated by using a received signal of a receiving antenna, in this embodiment of the present invention, the auto-correlation value and the cross-correlation value obtained through calculation according to the received signal on which the frequency offset compensation has been performed and that is obtained by the frequency offset estimation unit 40 are more accurate, so that a frame synchronization time can be more accurately determined when the two values are then compared with corresponding threshold values.

In addition, the methods for the third obtaining unit 50 to calculate the auto-correlation value according to the received signal on which the frequency offset compensation has been performed and calculate the cross-correlation value according to the received signal on which the frequency offset compensation has been performed and the preamble signal may be calculation methods in the prior art, and the calculation methods are preferred methods provided in this embodiment of the present invention, which are not limited in the present invention.

The synchronization unit 60 is configured to determine a time corresponding to the cross-correlation value and the auto-correlation value that are of the received signal on which the frequency offset compensation has been performed and that meet a third preset condition, as a frame synchronization time, and demodulate data according to the frame synchronization time to complete frame synchronization.

In some embodiments, the synchronization unit 60 may be configured to: compare the cross-correlation value of the received signal on which the frequency offset compensation has been performed with a second preset threshold, and compare the auto-correlation value of the received signal on which the frequency offset compensation has been performed with a third preset threshold; and if the cross-correlation value of the received signal on which the frequency offset compensation has been performed is greater than or equal to the second preset threshold and the auto-correlation value of the received signal on which the frequency offset compensation has been performed is greater than or equal to the third preset threshold, determine the time corresponding to the cross-correlation value and the auto-correlation value of the received signal on which the frequency offset compensation has been performed, as the frame synchronization time, and demodulate the data according to the frame synchronization time to complete frame synchronization.

In some embodiments, the second preset threshold includes a value obtained by multiplying, by a preset coefficient, a maximum value of L continuous cross-correlation values of the received signal on which the frequency offset compensation has been performed, where L is the length of the preamble signal.

Exemplarily, the third preset threshold may also be set to $\rho \in [0.5, 1]$, where a value of $\rho$ may be selected according to an actual need during calculation, the preset coefficient may be set to $\delta \in [0, 1]$, where a value of $\delta$ may be selected according to a need, and the length of the preamble signal sent by the transmitting antenna is 32. The third obtaining unit 50 obtains 32 cross-correlation values of received signals on which the frequency offset compensation has been performed, searches the 32 cross-correlation values for a maximum value $A_0$, and then uses $\tilde{A} = \delta A_0$ as the second preset threshold. If the cross-correlation value $A(t_2)$ and the auto-correlation value $\Gamma(t_2)$ at the time $t_2$ that are obtained by the third obtaining unit 50 meet $A(t_2) \geq \tilde{A}$ and $\Gamma(t_2) \geq \rho$, the time $t_2$ is determined as the frame synchronization time. If the cross-correlation value $A(t_2)$ and the cross-correlation value $\Gamma(t_2)$ at the time $t_2$ cannot meet both $A(t_2) \geq \tilde{A}$ and $\Gamma(t_2) \geq \rho$, the synchronization unit 60 determines whether a cross-correlation value $A(t_3)$ at a next time $t_3$ of $t_2$ meets $A(t_3) \geq \tilde{A}$ and whether an auto-correlation value $\Gamma(t_3)$ at $t_3$ meets $\Gamma(t_3) \geq \rho$, until a cross-correlation value at a particular time is greater than or equal to $\tilde{A}$ and an auto-correlation value at the particular time is greater than or equal to $\rho$, determines the time as the frame synchronization time, and then demodulates the data according to the determined frame synchronization time to complete frame synchronization.

It should be noted that, in the technical solution provided in the prior art, both a threshold corresponding to an auto-correlation value and a threshold corresponding to a cross-correlation value need to be manually estimated by technical personnel according to factors such as a power value of a signal sent by a transmitting antenna and a carrier frequency offset value. However, in the technical solution provided in this embodiment of the present invention, the first preset threshold, the second preset threshold, and the third preset threshold only need to be set by algorithms within a given value range in actual application. In this way, impact of manual experience on accuracy of frame synchronization time determining is avoided.

According to the frame synchronization apparatus provided in this embodiment of the present invention, first, a received signal of a receiving antenna is obtained; then an auto-correlation value of the received signal is obtained according to the received signal and an auto-correlation algorithm, and a time corresponding to the auto-correlation value that is of the received signal and that meets a first preset condition is determined as an initial estimation time; then a carrier frequency offset estimation value is obtained according to the initial estimation time, the received signal, and a frequency offset estimation algorithm, and frequency offset compensation is performed on the received signal by using the carrier frequency offset estimation value; then a cross-correlation value and an auto-correlation value of the received signal on which the frequency offset compensation has been performed are obtained according to the received signal on which the frequency offset compensation has been performed, a preamble signal that is sent by a transmitting antenna and that meets a second preset condition, a cross-correlation algorithm, and the auto-correlation algorithm; and a time corresponding to the cross-correlation value and the auto-correlation value that are of the received signal on which the frequency offset compensation has been performed and that meet a third preset condition is determined as a frame synchronization time, and data is demodulated according to the frame synchronization time to complete frame synchronization. In this way, impact of a carrier frequency offset can be reduced to determine a precise frame synchronization time, thereby accurately demodulating data.

Figure 3:
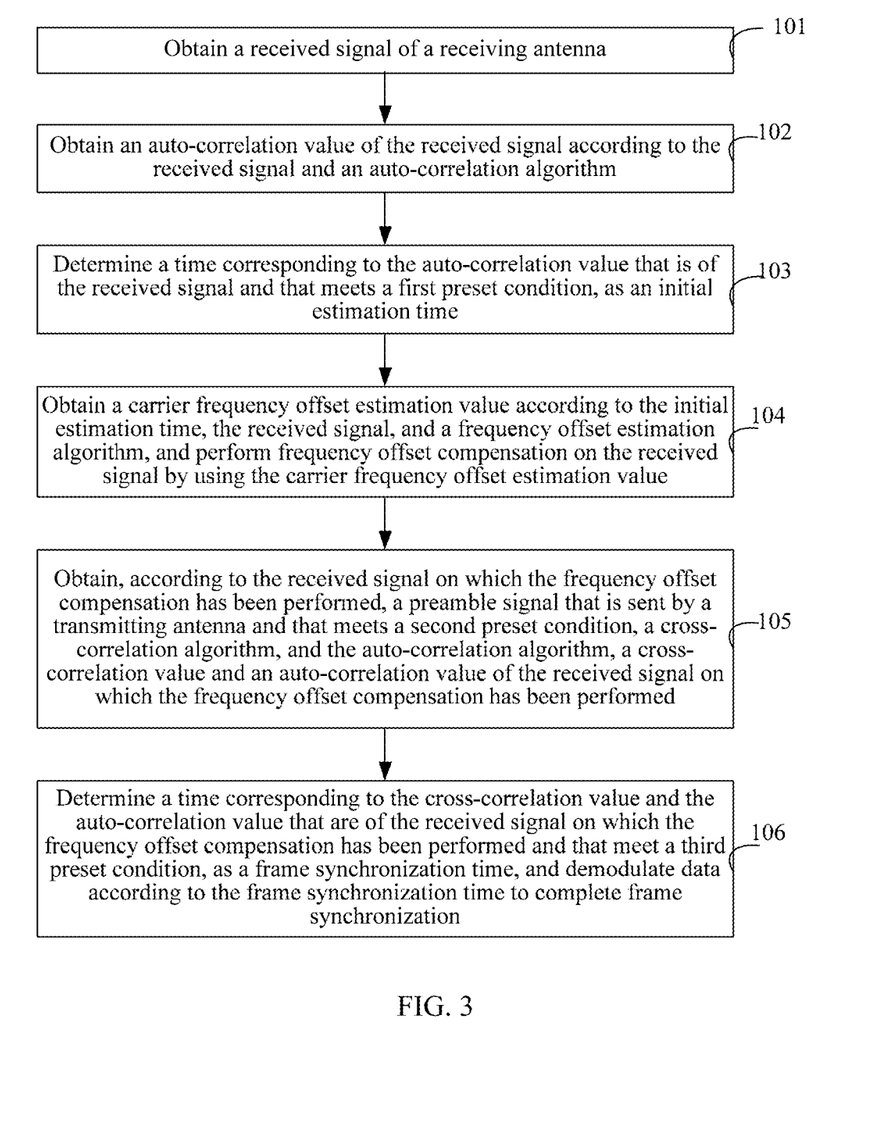
FIG. 3 is a schematic flowchart 1 of a frame synchronization method according to an embodiment of the present invention.

An embodiment of the present invention provides a frame synchronization method. As shown in FIG. 3, the method includes:

Step 101: Obtain a received signal of a receiving antenna.

Step 102: Obtain an auto-correlation value of the received signal according to the received signal and an auto-correlation algorithm.

Step 103: Determine a time corresponding to the auto-correlation value that is of the received signal and that meets a first preset condition, as an initial estimation time.

Step 104: Obtain a carrier frequency offset estimation value according to the initial estimation time, the received signal, and a frequency offset estimation algorithm, and perform frequency offset compensation on the received signal by using the carrier frequency offset estimation value.

Step 105: Obtain, according to the received signal on which the frequency offset compensation has been performed, a preamble signal that is sent by a transmitting antenna and that meets a second preset condition, a cross-correlation algorithm, and the auto-correlation algorithm, a cross-correlation value and an auto-correlation value of the received signal on which the frequency offset compensation has been performed.

Step 106: Determine a time corresponding to the cross-correlation value and the auto-correlation value that are of the received signal on which the frequency offset compensation has been performed and that meet a third preset condition, as a frame synchronization time, and demodulate data according to the frame synchronization time to complete frame synchronization.

According to the frame synchronization method provided in this embodiment of the present invention, first, a received signal of a receiving antenna is obtained; then an auto-correlation value of the received signal is obtained according to the received signal and an auto-correlation algorithm, and a time corresponding to the auto-correlation value that is of the received signal and that meets a first preset condition is determined as an initial estimation time; then a carrier frequency offset estimation value is obtained according to the initial estimation time, the received signal, and a frequency offset estimation algorithm, and frequency offset compensation is performed on the received signal by using the carrier frequency offset estimation value; then a cross-correlation value and an auto-correlation value of the received signal on which the frequency offset compensation has been performed are obtained according to the received signal on which the frequency offset compensation has been performed, a preamble signal that is sent by a transmitting antenna and that meets a second preset condition, a cross-correlation algorithm, and the auto-correlation algorithm; and a time corresponding to the cross-correlation value and the auto-correlation value that are of the received signal on which the frequency offset compensation has been performed and that meet a third preset condition is determined as a frame synchronization time, and data is demodulated according to the frame synchronization time to complete frame synchronization. In this way, impact of a carrier frequency offset can be reduced to determine a precise frame synchronization time, thereby accurately demodulating data.

Figure 4:
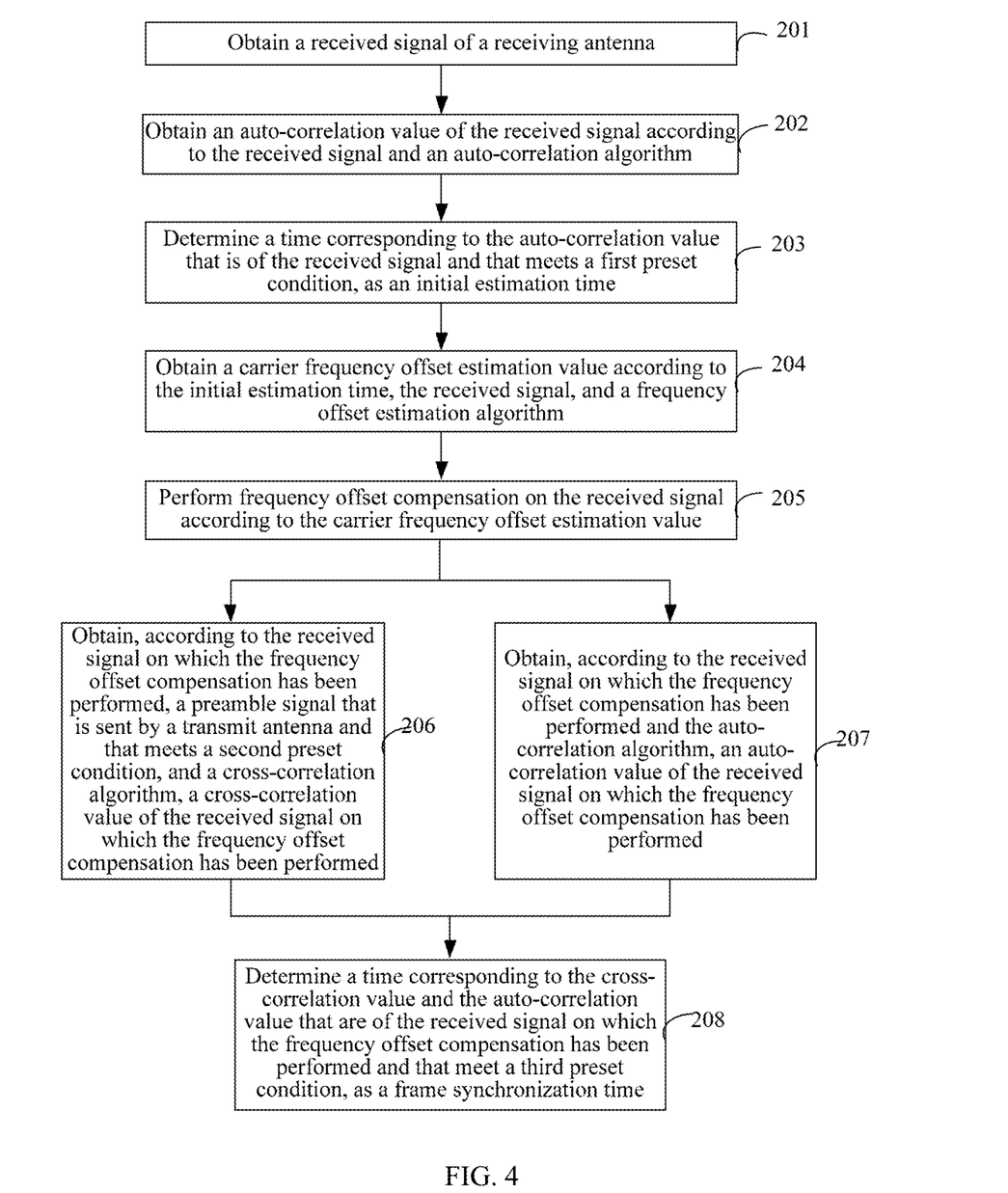
FIG. 4 is a schematic flowchart 2 of a frame synchronization method according to an embodiment of the present invention.

To make persons skilled in the art understand the technical solution provided in this embodiment of the present invention more clearly, the frame synchronization method provided in this embodiment of the present invention is described below in detail by using a specific embodiment. As shown in FIG. 4, the method includes:

Step 201: Obtain a received signal of a receiving antenna.

Exemplarily, in a MIMO communications system, it is assumed that there are N receiving antennas, and a received signal of each receiving antenna may be obtained.

Step 202: Obtain an auto-correlation value of the received signal according to the received signal and an auto-correlation algorithm.

Specifically, the auto-correlation value of the received signal is calculated according to a first auto-correlation value formula, where the first auto-correlation value formula includes:

$$\Gamma(t_0) = \sum_{n \in T} \frac{\sum_{l=0}^{L-1} y_n(t_0 - l - L) y_n^*(t_0 - l)}{\sum_{l=0}^{L-1} |y_n(t_0 - l)|^2},$$

where $\Gamma(t_0)$ is an auto-correlation value of the received signal at a time $t_0$, $y_n$ represents a received signal of a receiving antenna n, L is a length of a preamble signal, l is an integer and has a value set of $\{0, \ldots, L-1\}$, T is a set of receiving antennas for initial statistics collection, and * represents performing a conjugate operation.

It should be noted that, the method for calculating the auto-correlation value according to the received signal in step 202 may be a calculation method in the prior art, and the method provided in this embodiment is merely a preferred method; and the which is not intended to be limiting.

Step 203: Determine a time corresponding to the auto-correlation value that is of the received signal and that meets a first preset condition, as an initial estimation time.

Specifically, the auto-correlation value of the received signal is compared with a first preset threshold; and if the auto-correlation value of the received signal is greater than or equal to the first preset threshold, the time corresponding to the auto-correlation value of the received signal is determined as the initial estimation time.

Exemplarily, the first preset threshold may be set to $\rho \in [0.5, 1]$, where a value of $\rho$ may be selected according to an actual need during calculation, $\Gamma(t_0)$ obtained in step 202 is compared with $\rho$, and if $\Gamma(t_0) \geq \rho$, the time $t_0$ is determined as the initial estimation time.

Step 204: Obtain a carrier frequency offset estimation value according to the initial estimation time, the received signal, and a frequency offset estimation algorithm.

Specifically, the carrier frequency offset estimation value is calculated according to a frequency offset estimation formula, where the frequency offset estimation formula includes:

$$\Delta f_c = -\frac{T_s}{2\pi L} R\left(\sum_{n \in K} \sum_{l=0}^{L-1} y_n(t_1 - l - L) y_n^*(t_1 - l)\right),$$

where $y_n$ represents a received signal, of a receiving antenna n, $\Delta f_c$ is the carrier frequency offset estimation value, l is an integer and has a value set of $\{0, \ldots, L-1\}$, T is a time interval between adjacent $S_m(l)$ and $S_m(l+1)$ that are transmitted by a transmitting antenna m, L is a length of a preamble signal, $t_1 = t_0 + \eta$, $t_0$ is the initial estimation time, $\eta \in \{0, \alpha L\}$, $\alpha$ is a quantity of preamble signals sent by the transmitting antenna, K is a set of receiving antennas for frequency offset estimation, N is a set of receiving antennas, and * represents performing a conjugate operation.

Step 205: Perform frequency offset compensation on the received signal according to the carrier frequency offset estimation value.

Specifically, the carrier frequency offset estimation value is used as an input to a frequency offset compensation formula to obtain the received signal on which the frequency offset compensation has been performed, where the frequency offset compensation formula includes:

$$\tilde{y}_n(l) = y_n(l) \times e^{-j2\pi\Delta f_c l T_s},$$

$$n \in N,$$

where $\tilde{y}_n$ is a received signal, of a receiving antenna n, on which the frequency offset compensation has been performed, $y_n$ represents the received signal of the receiving antenna n, $\Delta f_c$ is the carrier frequency offset estimation value, l is an integer and has a value set of $\{0, \ldots, L-1\}$, $T_s$ is a time interval between adjacent $S_m(l)$ and $S_m(l+1)$ that are transmitted by a transmitting antenna m, L is a length of a preamble signal, $t_1 = t_0 + \eta$, $t_0$ is the initial estimation time, $\eta \in \{0, \alpha L\}$, $\alpha$ is a quantity of preamble signals sent by the transmitting antenna, K is a set of receiving antennas for frequency offset estimation, N is a set of receiving antennas, and * represents performing a conjugate operation.

It should be noted that, when a frequency offset compensation operation is performed on a received signal, the set $K \subseteq N$, that is, the set of receiving antennas for frequency offset estimation may not include all receiving antennas but include some receiving antennas. When frequency offset compensation is performed on a received signal, an antenna that belongs to the set K estimates a carrier frequency offset estimation value of the antenna and then performs frequency offset compensation on the antenna. To reduce complexity, a particular receiving antenna may not participate in frequency offset estimation, but perform frequency offset compensation by using a carrier frequency offset estimation value of a combination of receiving antennas whose carrier frequency offsets are close or the same. For example, a receiving antenna $p \notin K$ but $p \notin N$. When frequency offset compensation is performed on $y_p(l)$, $$\tilde{y}_p(l) = y_p(l) \times e^{-j2\pi\Delta f_c l T_s}.$$

Step 206: Obtain, according to the received signal on which the frequency offset compensation has been performed, a preamble signal that is sent by a transmitting antenna and that meets a second preset condition, and a cross-correlation algorithm, a cross-correlation value of the received signal on which the frequency offset compensation has been performed.

Specifically, the cross-correlation value of the received signal on which the frequency offset compensation has been performed is calculated according to a cross-correlation value formula, where the cross-correlation value formula includes:

$$A(t_2) = \sum_{m \in A_t} \sum_{n \in A} \sum_{l=0}^{L-1} \tilde{y}_n(t_2 - l) S_m^*(L - 1 - l),$$

where $A(t_2)$ is a cross-correlation value, at a time $t_2$, of the received signal on which the frequency offset compensation has been performed, $A_t$ is a set of transmitting antennas for calculating a cross-correlation, A is a set of receiving antennas for calculating a cross-correlation value, $\tilde{y}_n$ is a received signal, of a receiving antenna n, on which the frequency offset compensation has been performed, $S_m$ is a preamble signal sent by a transmitting antenna m, L is a length of the preamble signal, l is an integer and has a value set of $\{0, \ldots, L-1\}$, and * represents performing a conjugate operation.

Step 207: Obtain, according to the received signal on which the frequency offset compensation has been performed and the auto-correlation algorithm, an auto-correlation value of the received signal on which the frequency offset compensation has been performed.

Specifically, the auto-correlation value of the received signal on which the frequency offset compensation has been performed is calculated according to a second auto-correlation value formula, where the second auto-correlation value formula includes:

$$\Gamma(t_2) = \sum_{n \in T} \frac{\sum_{l=0}^{L-1} \tilde{y}_n(t_2 - l - L)\tilde{y}_n^*(t_2 - l)}{\sum_{l=0}^{L-1} |\tilde{y}_n(t_2 - l)|^2},$$

where $\Gamma(t_2)$ is an auto-correlation value, at the time $t_2$, of the received signal on which the frequency offset compensation has been performed, $\tilde{y}_n$ represents the received signal, of the receiving antenna n, on which the frequency offset compensation has been performed, L is the length of the preamble signal, l is the integer and has the value set of $\{0, \ldots, L-1\}$, T is a set of receiving antennas for initial statistics collection, and * represents performing a conjugate operation.

It should be noted that, the methods for calculating the auto-correlation value according to the received signal on which the frequency offset compensation has been performed and calculating the cross-correlation value according to the received signal on which the frequency offset compensation has been performed and the preamble signal in step 206 and step 207 may be calculation methods in the prior art, and the calculation methods in step 206 and step 207 are preferred methods provided in this embodiment of the present invention, which are not limited in the present invention. In addition, step 206 and step 207 are not necessarily performed in a particular order.

Step 208: Determine a time corresponding to the cross-correlation value and the auto-correlation value that are of the received signal on which the frequency offset compensation has been performed and that meet a third preset condition, as a frame synchronization time.

Specifically, the cross-correlation value of the received signal on which the frequency offset compensation has been performed is compared with a second preset threshold, and the auto-correlation value of the received signal on which the frequency offset compensation has been performed is compared with a third preset threshold; and if the cross-correlation value of the received signal on which the frequency offset compensation has been performed is greater than or equal to the second preset threshold and the auto-correlation value of the received signal on which the frequency offset compensation has been performed is greater than or equal to the third preset threshold, the time corresponding to the cross-correlation value and the auto-correlation value of the received signal on which the frequency offset compensation has been performed is determined as the frame synchronization time.

The second preset threshold includes a value obtained by multiplying, by a preset coefficient, a maximum value of L continuous cross-correlation values of the received signal on which the frequency offset compensation has been performed, where L is the length of the preamble signal.

Exemplarily, the third preset threshold may also be set to $\rho \in [0.5,1]$, where a value of $\rho$ may be selected according to an actual need during calculation, the preset coefficient may be set to $\delta \in [0,1]$, where a value of $\delta$ may be selected according to a need, and the length of the preamble signal sent by the transmitting antenna is 32, obtains 32 cross-correlation values of received signals on which the frequency offset compensation has been performed, searches the 32 cross-correlation values for a maximum value $A_0$, and then uses $\tilde{A}=\delta^*A_0$ as the second preset threshold. If the cross-correlation value $A(t_2)$ and the auto-correlation value $\Gamma(t_2)$ at the time $t_2$ that are obtained by the third obtaining unit 50 meet $A(t_2) \geq \tilde{A}$ and $\Gamma(t_2) \geq \rho$, the time $t_2$ is determined as the frame synchronization time. If the cross-correlation value $A(t_2)$ and the cross-correlation value $\Gamma(t_2)$ at the time $t_2$ cannot meet both $A(t_2) \geq \tilde{A}$ and $\Gamma(t_2) \geq \rho$, it is determined whether a cross-correlation value $A(t_3)$ at a next time $t_3$ of $t_2$ meets $A(t_3) \geq \tilde{A}$ and whether an auto-correlation value $\Gamma(t_3)$ at $t_3$ meets $\Gamma(t_3) \geq \rho$, until a cross-correlation value at a particular time is greater than or equal to $\tilde{A}$ and an auto-correlation value at the particular time is greater than or equal to $\rho$, the time is determined as the frame synchronization time, and then the data is demodulated according to the determined frame synchronization time to complete frame synchronization.

Figure 5:
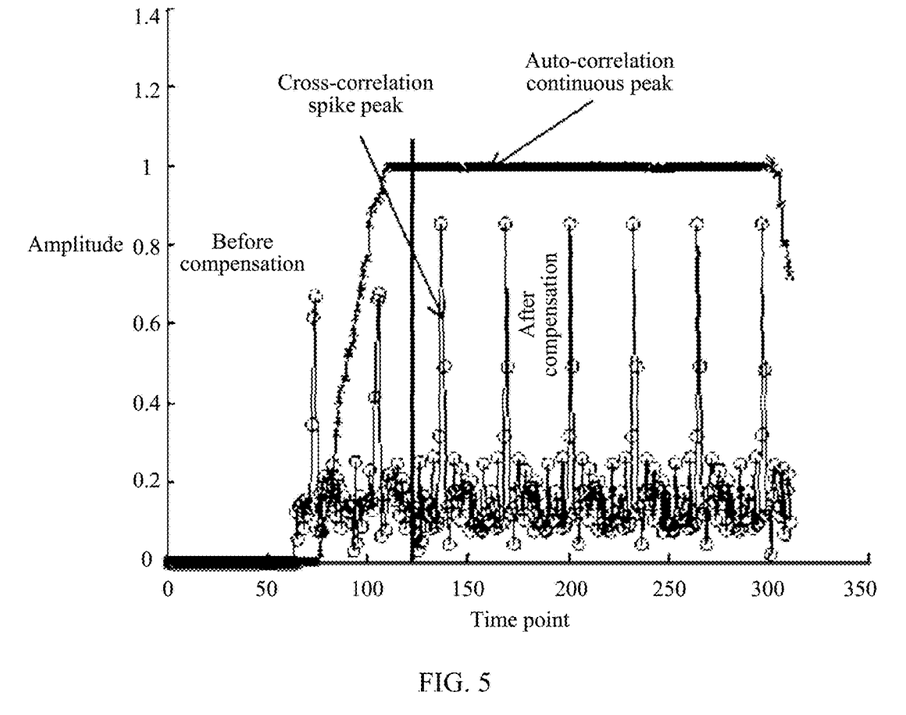
FIG. 5 is a schematic simulation diagram of a frame synchronization method according to an embodiment of the present invention.
Figure 6:
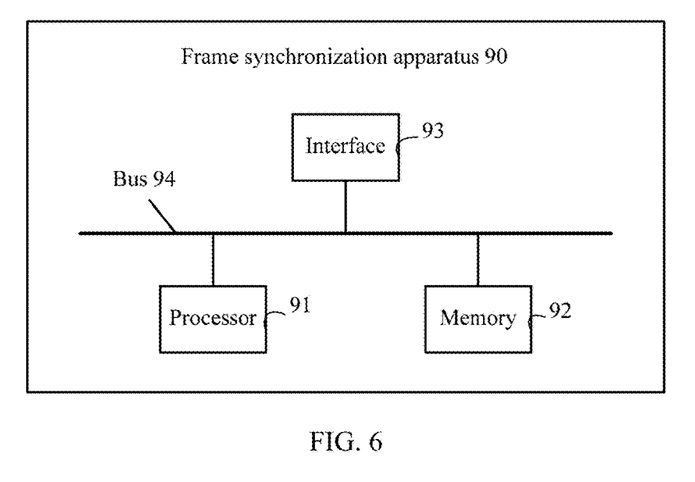
FIG. 6 is a schematic structural diagram 3 of a frame synchronization apparatus according to an embodiment of the present invention.

Exemplarily, simulation is performed for the frame synchronization method provided in this embodiment of the present invention, as shown in FIG. 6, where an auto-correlation continuous peak is formed by auto-correlation values of continuous received signals, and a cross-correlation spike peak is formed by cross-correlation values of continuous received signals. It can be seen from FIG. 5 that a cross-correlation value, that is, a cross-correlation spike peak is not affected by a carrier frequency offset, and after frequency offset compensation is performed, the spike peak is sharper. Therefore, a more precise frame synchronization time can be obtained.

It should be noted that, in the technical solution provided in the prior art, both a threshold corresponding to an auto-correlation value and a threshold corresponding to a cross-correlation value need to be manually estimated by technical personnel according to factors such as a power value of a signal sent by a transmitting antenna and a carrier frequency offset value. However, in the technical solution provided in this embodiment of the present invention, the first preset threshold, the second preset threshold, and the third preset threshold only need to be set by algorithms within a given value range in actual application. In this way, impact of manual experience on accuracy of frame synchronization time determining is avoided.

According to the frame synchronization method provided in this embodiment of the present invention, first, a received signal of a receiving antenna is obtained; then an auto-correlation value of the received signal is obtained according to the received signal and an auto-correlation algorithm, and a time corresponding to the auto-correlation value that is of the received signal and that meets a first preset condition is determined as an initial estimation time; then a carrier frequency offset estimation value is obtained according to the initial estimation time, the received signal, and a frequency offset estimation algorithm, and frequency offset compensation is performed on the received signal by using the carrier frequency offset estimation value; then a cross-correlation value and an auto-correlation value of the received signal on which the frequency offset compensation has been performed are obtained according to the received signal on which the frequency offset compensation has been performed, a preamble signal that is sent by a transmitting antenna and that meets a second preset condition, a cross-correlation algorithm, and the auto-correlation algorithm, and a time corresponding to the cross-correlation value and the auto-correlation value that are of the received signal on which the frequency offset compensation has been performed and that meet a third preset condition is determined as a frame synchronization time, and data is demodulated according to the frame synchronization time to complete frame synchronization. In this way, impact of a carrier frequency offset can be reduced to determine a precise frame synchronization time, thereby accurately demodulating data.

An embodiment of the present invention provides another frame synchronization apparatus 90. As shown in FIG. 6, the apparatus 90 includes: a bus 94; and a processor 91, a memory 92, and an interface 93 that are connected to the bus 94, where the interlace 93 is configured for communication; the memory 92 is configured to store computer code; and the processor 91 is configured to execute the computer code to: obtain a received signal of a receiving antenna; obtain an auto-correlation value of the received signal according to the received signal and an auto-correlation algorithm; determine a time corresponding to the auto-correlation value that is of the received signal and that meets a first preset condition, as an initial estimation time; obtain a carrier frequency offset estimation value according to the initial estimation time, the received signal, and a frequency offset estimation algorithm, and perform frequency offset compensation on the received signal by using the carrier frequency offset estimation value; obtain, according to the received signal on which the frequency offset compensation has been performed, a preamble signal that is sent by a transmitting antenna and that meets a second preset condition, a cross-correlation algorithm, and the auto-correlation algorithm, a cross-correlation value and an auto-correlation value of the received signal on which the frequency offset compensation has been performed; and determine a time corresponding to the cross-correlation value and the auto-correlation value that are of the received signal on which the frequency offset compensation has been performed and that meet a third preset condition, as a frame synchronization time, and demodulate data according to the frame synchronization time to complete frame synchronization.

In some embodiments, the second preset condition includes:

$$\sum_{l=0}^{L-1} S_m(l)S_m^*(l) \geq 3\sum_{l=0}^{L-1} S_n(l)S_m^*(l) \quad n \neq m$$

-continued $$\sum_{l=0}^{L-1} S_m(l)S_m^*(l) \geq 3\sum_{l=0}^{L-1} S_m([l+p]_L)S_m^*(l) \quad p \neq 0,$$

and where $S_m(l)$ is a preamble signal sent by a transmitting antenna m, $S_n(l)$ is a preamble signal sent by a transmitting antenna n, $[l+p]_L$ represents performing a cyclic shift on l+p by a length L, m and n represent numbers of different transmitting antenna s, L is a length of $S_m(l)$, l is an integer and has a value set of $\{0, \ldots, L-1\}$, p is an integer and has a value set that is a set consisting of remaining elements obtained after an element 0 is removed from the value set of l, and * represents performing a conjugate operation.

In some embodiments, when executing the computer code to obtain the auto-correlation value of the received signal according to the received signal and the auto-correlation algorithm, the processor 91 is configured to calculate the auto-correlation value of the received signal according to a first auto-correlation value formula, where the first auto-correlation value formula includes:

$$\Gamma(t_0) = \sum_{n \in T} \frac{\sum_{l=0}^{L-1} y_n(t_0 - l - L)y_n^*(t_0 - l)}{\sum_{l=0}^{L-1} |y_n(t_0 - l)|^2},$$

where $\Gamma(t_0)$ is an auto-correlation value of the received signal at a time $t_0$, $y_n$ represents a received signal of a receiving antenna n, L is a length of the preamble signal, l is an integer and has a value set of $\{0, \ldots, L-1\}$, T is a set of receiving antennas for initial statistics collection, and * represents performing a conjugate operation.

In some embodiments, when executing the computer code to determine the time corresponding to the auto-correlation value that is of the received signal and that meets the first preset condition, as the initial estimation time, the processor 91 is configured to: compare the auto-correlation value of the received signal with a first preset threshold; and if the auto-correlation value of the received signal is greater than or equal to the first preset threshold, determine the time corresponding to the auto-correlation value of the received signal as the initial estimation time.

In some embodiments, when executing the computer code to obtain the carrier frequency offset estimation value according to the initial estimation time, the received signal, and the frequency offset estimation algorithm, and perform the frequency offset compensation on the received signal by using the carrier frequency offset estimation value, the processor 91 is configured to: calculate the carrier frequency offset estimation value according to a frequency offset estimation formula, where the frequency offset estimation formula includes:

$$\Delta f_c = -\frac{T_s}{2\pi L} R\left(\sum_{n \in K} \sum_{l=0}^{L-1} y_n(t_1 - l - L)y_n^*(t_1 - l)\right);$$

and use the carrier frequency offset estimation value as an input to a frequency offset compensation formula to obtain the received signal on which the frequency offset compensation has been performed, where the frequency offset compensation formula includes:

$$\tilde{y}_n(l) = y_n(l) \times e^{-j2\pi\Delta f_c lT_s},$$

$n \in N,$ where $\tilde{y}_n$ is a received signal, of a receiving antenna n, on which the frequency offset compensation has been performed, $\Delta f_c$ is the carrier frequency offset estimation value, $y_n$ represents the received signal of the receiving antenna n, l is an integer and has a value set of $\{0, \ldots, L-1\}$, $T_s$ is a time interval between adjacent $S_m(l)$ and $S_m(l+1)$ that are transmitted by a transmitting antenna m, L is a length of the preamble signal, $t_1 = t_0 + \eta$, $t_0$ is the initial estimation time, $\eta \in \{0, \alpha L\}$, $\alpha$ is a quantity of preamble signals sent by the transmitting antenna, K is a set of receiving antennas for frequency offset estimation, N is a set of receiving antennas, and * represents performing a conjugate operation.

In some embodiments, when executing the computer code to obtain, according to the received signal on which the frequency offset compensation has been performed, the preamble signal that is sent by the transmitting antenna and that meets the second preset condition, the cross-correlation algorithm, and the auto-correlation algorithm, the cross-correlation value and the auto-correlation value of the received signal on which the frequency offset compensation has been performed, the processor 91 is configured to: calculate, according to a cross-correlation value formula, the cross-correlation value of the received signal on which the frequency offset compensation has been performed, where the cross-correlation value formula includes:

$$A(t_2) = \sum_{m \in A_t} \sum_{n \in A} \sum_{l=0}^{L-1} \tilde{y}_n(t_2 - l)S_m^*(L - 1 - l),$$

where $A(t_2)$ is a cross-correlation value, at a time $t_2$, of the received signal on which the frequency offset compensation has been performed, $A_t$ is a set of transmitting antenna s for calculating a cross-correlation, A is a set of receiving antennas for calculating a cross-correlation value, $\tilde{y}_n$ is a received signal, of a receiving antenna n, on which the frequency offset compensation has been performed, $S_m$ is a preamble signal sent by a transmitting antenna m, L is a length of the preamble signal, l is an integer and has a value set of $\{0, \ldots, L-1\}$, and * represents performing a conjugate operation; and calculate, according to a second auto-correlation value formula, the auto-correlation value of the received signal on which the frequency offset compensation has been performed, where the second auto-correlation value formula includes:

$$\Gamma(t_2) = \sum_{n \in T} \frac{\sum_{l=0}^{L-1} \tilde{y}_n(t_2 - l - L)\tilde{y}_n^*(t_2 - l)}{\sum_{l=0}^{L-1} |\tilde{y}_n(t_2 - l)|^2},$$

where $\Gamma(t_2)$ is an auto-correlation value, at the time $t_2$, of the received signal on which the frequency offset compensation has been performed, $\tilde{y}_n$ represents the received signal, of the receiving antenna n, on which the frequency offset compensation has been performed, L is the length of the preamble signal, l is the integer and has the value set of $\{0, \ldots, L-1\}$, T is a set of receiving antennas for initial statistics collection, and * represents performing a conjugate operation.

In in some embodiments, when executing the computer code to determine the time corresponding to the cross-correlation value and the auto-correlation value that are of the received signal on which the frequency offset compensation has been performed and that meet a third preset condition, as the frame synchronization time, the processor 91 is configured to: compare the cross-correlation value of the received signal on which the frequency offset compensation has been performed with a second preset threshold, and compare the auto-correlation value of the received signal on which the frequency offset compensation has been performed with a third preset threshold; and if the cross-correlation value of the received signal on which the frequency offset compensation has been performed is greater than or equal to the second preset threshold and the auto-correlation value of the received signal on which the frequency offset compensation has been performed is greater than or equal to the third preset threshold, determine the time corresponding to the cross-correlation value and the auto-correlation value of the received signal on which the frequency offset compensation has been performed, as the frame synchronization time, and demodulate the data according to the frame synchronization time to complete frame synchronization.

In some embodiments, the second preset threshold includes: a value obtained by multiplying, by a preset coefficient, a maximum value of L continuous cross-correlation values of the received signal on which the frequency offset compensation has been performed, where L is the length of the preamble signal.

According to the frame synchronization apparatus provided in this embodiment of the present invention, first, a received signal of a receiving antenna is obtained; then an auto-correlation value of the received signal is obtained according to the received signal and an auto-correlation algorithm, and a time corresponding to the auto-correlation value that is of the received signal and that meets a first preset condition is determined as an initial estimation time; then a carrier frequency offset estimation value is obtained according to the initial estimation time, the received signal, and a frequency offset estimation algorithm, and frequency offset compensation is performed on the received signal by using the carrier frequency offset estimation value; then a cross-correlation value and an auto-correlation value of the received signal on which the frequency offset compensation has been performed are obtained according to the received signal on which the frequency offset compensation has been performed, a preamble signal that is sent by a transmitting antenna and that meets a second preset condition, a cross-correlation algorithm, and the auto-correlation algorithm, and a time corresponding to the cross-correlation value and the auto-correlation value that are of the received signal on which the frequency offset compensation has been performed and that meet a third preset condition is determined as a frame synchronization time, and data is demodulated according to the frame synchronization time to complete frame synchronization. In this way, impact of a carrier frequency offset can be reduced to determine a precise frame synchronization time, thereby accurately demodulating data.

In the several embodiments provided in the present invention, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor (processor) to perform some of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

It may be clearly understood by persons skilled in the art that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing apparatus, reference may be made to a corresponding process in the foregoing method embodiments, and details are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A frame synchronization method, comprising:
obtaining a received signal of a receiving antenna;
obtaining an auto-correlation value of the received signal according to the received signal and an auto-correlation algorithm;
determining a time corresponding to the auto-correlation value that is of the received signal and that meets a first preset condition, as an initial estimation time;
obtaining a carrier frequency offset estimation value according to the initial estimation time, the received signal, and a frequency offset estimation algorithm, and performing frequency offset compensation on the received signal by using the carrier frequency offset estimation value;
obtaining, according to the received signal on which the frequency offset compensation has been performed, a preamble signal that is sent by a transmitting antenna and that meets a second preset condition, using a cross-correlation algorithm, and the auto-correlation algorithm, to computer a cross-correlation value and an auto-correlation value of the received signal on which the frequency offset compensation has been performed; and
determining a time corresponding to the cross-correlation value and the auto-correlation value that are of the received signal on which the frequency offset compensation has been performed and that meet a third preset condition, as a frame synchronization time, and demodulating data according to the frame synchronization time to complete frame synchronization;
wherein the second preset condition comprises:

$$\sum_{l=0}^{L-1} S_m(l)S_m^*(l) \geq 3\sum_{l=0}^{L-1} S_m(l)S_n^*(l) \quad n \neq m, \text{ and}$$

$$\sum_{l=0}^{L-1} S_m(l)S_m^*(l) \geq 3\sum_{l=0}^{L-1} S_m([l+p]_L)S_m^*(l) \quad p \neq 0,$$

wherein
$S_m(l)$ is a preamble signal sent by a transmitting antenna m, $S_n(l)$ is a preamble signal sent by a transmitting antenna n, $[l+p]_L$ represents performing a cyclic shift on l+p by a length L, m and n represent numbers of different transmitting antenna s, L is a length of $S_m(l)$, l is an integer and has a value set of $\{0, \ldots, L-1\}$, p is an integer and has a value set that is a set consisting of remaining elements obtained after an element 0 is removed from the value set of l, and * represents performing a conjugate operation.

2. The method according to claim 1, wherein the obtaining the auto-correlation value of the received signal according to the received signal and an auto-correlation algorithm comprises:
calculating the auto-correlation value of the received signal according to a first auto-correlation value formula, wherein the first auto-correlation value formula comprises:

$$\Gamma(t_0) = \sum_{n \in T} \frac{\sum_{l=0}^{L-1} y_n(t_0 - l - L)y_n^*(t_0 - l)}{\sum_{l=0}^{L-1} |y_n(t_0 - l)|^2},$$

wherein
$\Gamma(t_0)$ is an auto-correlation value of the received signal at a time $t_0$, $y_n$ represents a received signal of a receiving antenna n, L is a length of the preamble signal, l is an integer and has a value set of $\{0, \ldots, L-1\}$, $\Gamma(t_0)$ is a set of receiving antennas for initial statistics collection, and * represents performing a conjugate operation.

3. The method according to claim 1, wherein the determining the time corresponding to the auto-correlation value that is of the received signal and that meets a first preset condition, as an initial estimation time comprises:
comparing the auto-correlation value of the received signal with a first preset threshold; and
if the auto-correlation value of the received signal is greater than or equal to the first preset threshold, determining the time corresponding to the auto-correlation value of the received signal as the initial estimation time.

4. The method according to claim 1, wherein the obtaining the carrier frequency offset estimation value according to the initial estimation time, the received signal, and a frequency offset estimation algorithm, and performing frequency offset compensation on the received signal by using the carrier frequency offset estimation value comprises:
calculating the carrier frequency offset estimation value according to a frequency offset estimation formula, wherein the frequency offset estimation formula comprises:

$$\Delta f_c = -\frac{T_s}{2\pi L} R\left(\sum_{n \in K} \sum_{l=0}^{L-1} y_n(t_1 - l - L)y_n^*(t_1 - 1)\right);$$

and
using the carrier frequency offset estimation value as an input to a frequency offset compensation formula to obtain the received signal on which the frequency offset compensation has been performed, wherein the frequency offset compensation formula comprises:

$$\tilde{y}_n(l) = y_n(l) \times e^{-j2\pi \Delta f_c l T_s},$$

$$n \in N,$$

wherein
$\tilde{y}_n$ is a received signal, of a receiving antenna n, on which the frequency offset compensation has been performed, $\Delta f_c$ is the carrier frequency offset estimation value, $y_n$ represents the received signal of the receiving antenna n, l is an integer and has a value set of $\{0, \ldots, L-1\}$, $T_s$ is a time interval between adjacent $S_m(l)$ and $S_m(l+1)$ that are transmitted by a transmitting antenna m, L is a length of the preamble signal, $t_1 = t_0 + \eta$, $t_0$ is the initial estimation time, $\eta \in \{0, \alpha L\}$, $\alpha$ is a quantity of preamble signals sent by the transmitting antenna, K is a set of receiving antennas for frequency offset estimation, N is a set of receiving antennas, and * represents performing a conjugate operation.

5. The method according to claim 1, wherein the obtaining, according to the received signal on which the frequency offset compensation has been performed, the preamble signal that is sent by a transmitting antenna and that meets a second preset condition, a cross-correlation algorithm, and the auto-correlation algorithm, the cross-correlation value and the auto-correlation value of the received signal on which the frequency offset compensation has been performed comprises:

calculating, according to a cross-correlation value formula, the cross-correlation value of the received signal on which the frequency offset compensation has been performed, wherein the cross-correlation value formula comprises:

$$A(t_2) = \sum_{m \in A_t} \sum_{n \in A} \sum_{l=0}^{L-1} \tilde{y}_n(t_2 - l) S_m^*(L - 1 - l),$$

wherein

A($t_2$) is a cross-correlation value, at a time $t_2$, of the received signal on which the frequency offset compensation has been performed, $A_t$ is a set of transmitting antenna s for calculating a cross-correlation, A is a set of receiving antennas for calculating a cross-correlation value, $\tilde{y}_n$ is a received signal, of a receiving antenna n, on which the frequency offset compensation has been performed, $S_m$ is a preamble signal sent by a transmitting antenna m, L is a length of the preamble signal, l is an integer and has a value set of $\{0, \ldots, L-1\}$, and * represents performing a conjugate operation; and calculating, according to a second auto-correlation value formula, the auto-correlation value of the received signal on which the frequency offset compensation has been performed, wherein the second auto-correlation value formula comprises:

$$\Gamma(t_2) = \sum_{n \in T} \frac{\sum_{l=0}^{L-1} \tilde{y}_n(t_2 - l - L)\tilde{y}_n^*(t_2 - l)}{\sum_{l=0}^{L-1} |\tilde{y}_n(t_2 - l)|^2},$$

wherein $\Gamma(t_2)$ is an auto-correlation value, at the time $t_2$, of the received signal on which the frequency offset compensation has been performed, $\tilde{y}_n$ represents the received signal, of the receiving antenna n, on which the frequency offset compensation has been performed, L is the length of the preamble signal, l is the integer and has the value set of $\{0, \ldots, L-1\}$, $\Gamma(t_2)$ is a set of receiving antennas for initial statistics collection, and * represents performing a conjugate operation.

6. The method according to claim 1, wherein the determining the time corresponding to the cross-correlation value and the auto-correlation value that are of the received signal on which the frequency offset compensation has been performed and that meet a third preset condition, as a frame synchronization time comprises:

comparing the cross-correlation value of the received signal on which the frequency offset compensation has been performed with a second preset threshold, and comparing the auto-correlation value of the received signal on which the frequency offset compensation has been performed with a third preset threshold; and if the cross-correlation value of the received signal on which the frequency offset compensation has been performed is greater than or equal to the second preset threshold and the auto-correlation value of the received signal on which the frequency offset compensation has been performed is greater than or equal to the third preset threshold, determining the time corresponding to the cross-correlation value and the auto-correlation value of the received signal on which the frequency offset compensation has been performed, as the frame synchronization time, and demodulating the data according to the frame synchronization time to complete frame synchronization.

7. The method according to claim 6, wherein the second preset threshold comprises:

a value obtained by multiplying, by a preset coefficient, a maximum value of L continuous cross-correlation values of the received signal on which the frequency offset compensation has been performed, wherein L is the length of the preamble signal.

8. A frame synchronization apparatus, wherein the apparatus comprises: a communications interface, a memory, and a processor, wherein the communications interface is configured to communicate with a network element; the memory is configured to store computer code; and the processor is configured to execute the computer code to:

obtain a received signal of a receiving antenna;

obtain an auto-correlation value of the received signal according to the received signal and an auto-correlation algorithm;

determine a time corresponding to the auto-correlation value that is of the received signal and that meets a first preset condition, as an initial estimation time;

obtain a carrier frequency offset estimation value according to the initial estimation time, the received signal, and a frequency offset estimation algorithm, and perform frequency offset compensation on the received signal by using the carrier frequency offset estimation value. obtain, according to the received signal on which the frequency offset compensation has been performed, a preamble signal that is sent by a transmitting antenna and that meets a second preset condition, using a cross-correlation algorithm, and the auto-correlation algorithm, to computer a cross-correlation value and an auto-correlation value of the received signal on which the frequency offset compensation has been performed; and determine a time corresponding to the cross-correlation value and the auto-correlation value that are of the received signal on which the frequency offset compensation has been performed and that meet a third preset condition, as a frame synchronization time, and demodulate data according to the frame synchronization time to complete frame synchronization;

wherein the second preset condition comprises:

$$\sum_{l=0}^{L-1} S_m(l) S_m^*(l) \geq 3 \sum_{l=0}^{L-1} S_m(l) S_m^*(l) \qquad n \neq m, \text{ and}$$

$$\sum_{l=0}^{L-1} S_m(l) S_m^*(l) \geq 3 \sum_{l=0}^{L-1} S_m([l+p]_L) S_m^*(l) \qquad p \neq 0,$$

wherein
- $S_m(l)$ is a preamble signal sent by a transmitting antenna m, $S_n(l)$ is a preamble signal sent by a transmitting antenna n, $[l+p]_L$ represents performing a cyclic shift on l+p by a length L, m and n represent numbers of different transmitting antenna s, L is a length of $S_m(l)$, l is an integer and has a value set of $\{0, \ldots, L-1\}$, p is an integer and has a value set that is a set consisting of remaining elements obtained after an element 0 is removed from the value set of l, and * represents performing a conjugate operation.

9. The apparatus according to claim 8, wherein the processor is further configured to execute the computer code to:
- calculate the auto-correlation value of the received signal according to a first auto-correlation value formula, wherein the first auto-correlation value formula comprises:

$$\Gamma(t_0) = \sum_{n \in T} \frac{\sum_{l=0}^{L-1} y_n(t_0 - l - L) y_n^*(t_0 - l)}{\sum_{l=0}^{L-1} |y_n(t_0 - l)|^2},$$

wherein
- $\Gamma(t_0)$ is an auto-correlation value of the received signal at a time $t_0$, $y_n$ represents a received signal of a receiving antenna n, L is a length of the preamble signal, l is an integer and has a value set of $\{0, \ldots, L-1\}$, T is a set of receiving antennas for initial statistics collection, and * represents performing a conjugate operation.

10. The apparatus according to claim 8, wherein the processor is further configured to execute the computer code to:
- compare the auto-correlation value of the received signal with a first preset threshold; and
- if the auto-correlation value of the received signal is greater than or equal to the first preset threshold, determine the time corresponding to the auto-correlation value of the received signal as the initial estimation time.

11. The apparatus according to claim 8, wherein the processor is further configured to execute the computer code to:
- calculate the carrier frequency offset estimation value according to a frequency offset estimation formula, wherein the frequency offset estimation formula comprises:

$$\Delta f_c = -\frac{T_S}{2\pi L} \arg\left(\sum_{n \in K} \sum_{l=0}^{L-1} y_n(t_1 - l - L) y_n^*(t_1 - l)\right);$$

and
- use the carrier frequency offset estimation value as an input to a frequency offset compensation formula to obtain the received signal on which the frequency offset compensation has been performed, wherein the frequency offset compensation formula comprises:

$$\tilde{y}_n(l) = y_n(l) \times e^{-j2\pi \Delta f_c l T_s},$$

$$n \in N,$$

wherein
- $\tilde{y}_n$ is a received signal, of a receiving antenna n, on which the frequency offset compensation has been performed, $\Delta f_c$ is the carrier frequency offset estimation value, $y_n$ represents the received signal of the receiving antenna n, l is an integer and has a value set of $\{0, \ldots, L-1\}$, $T_s$ is a time interval between adjacent $S_m(l)$ and $S_m(l+1)$ that are transmitted by a transmitting antenna m, L is a length of the preamble signal, $t_1 = t_0 + \eta$, $t_0$ is the initial estimation time, $\eta \in \{0, \alpha L\}$, $\alpha$ is a quantity of preamble signals sent by the transmitting antenna, K is a set of receiving antennas for frequency offset estimation, N is a set of receiving antennas, and * represents performing a conjugate operation.

12. The apparatus according to claim 8, wherein the processor is further configured to execute the computer code to:
- calculate, according to a cross-correlation value formula, the cross-correlation value of the received signal on which the frequency offset compensation has been performed, wherein the cross-correlation value formula comprises:

$$A(t_2) = \sum_{n \in A} \sum_{l=0}^{L-1} \tilde{y}_n(t_2 - l) S_m^*(L - 1 - l),$$

wherein
- $A(t_2)$ is a cross-correlation value, at a time $t_2$, of the received signal on which the frequency offset compensation has been performed, A is a set of receiving antennas for calculating a cross-correlation value, $\tilde{y}_n$ is a received signal, of a receiving antenna n, on which the frequency offset compensation has been performed, $S_m$ is a preamble signal sent by a transmitting antenna m, L is a length of the preamble signal, l is an integer and has a value set of $\{0, \ldots, L-1\}$, and * represents performing a conjugate operation; and
- calculate, according to a second auto-correlation value formula, the auto-correlation value of the received signal on which the frequency offset compensation has been performed, wherein the second auto-correlation value formula comprises:

$$\Gamma(t_2) = \sum_{n \in T} \frac{\sum_{l=0}^{L-1} \tilde{y}_n(t_2 - l - L) \tilde{y}_n^*(t_2 - l)}{\sum_{l=0}^{L-1} |\tilde{y}_n(t_2 - l)|^2},$$

wherein
- $\Gamma(t_2)$ is an auto-correlation value, at the time $t_2$, of the received signal on which the frequency offset compensation has been performed, $\tilde{y}_n$ represents the received signal, of the receiving antenna n, on which the frequency offset compensation has been performed, L is the length of the preamble signal, l is the integer and has the value set of $\{0, \ldots, L-1\}$, T is a set of receiving antennas for initial statistics collection, and * represents performing a conjugate operation.

13. The apparatus according to claim 8, wherein the processor is further configured to execute the computer code to:
- compare the cross-correlation value of the received signal on which the frequency offset compensation has been performed with a second preset threshold, and compare the auto-correlation value of the received signal on which the frequency offset compensation has been performed with a third preset threshold; and
- if the cross-correlation value of the received signal on which the frequency offset compensation has been performed is greater than or equal to the second preset threshold and the auto-correlation value of the received signal on which the frequency offset compensation has been performed is greater than or equal to the third preset threshold, determine the time corresponding to the cross-correlation value and the auto-correlation value of the received signal on which the frequency offset compensation has been performed, as the frame synchronization time, and demodulate the data according to the frame synchronization time to complete frame synchronization.

14. The apparatus according to claim 13, wherein the second preset threshold comprises:
- a value obtained by multiplying, by a preset coefficient, a maximum value of L continuous cross-correlation values of the received signal on which the frequency offset compensation has been performed, wherein L is the length of the preamble signal.

\* \* \* \* \*